(12) United States Patent
Walther

(10) Patent No.: US 8,567,151 B2
(45) Date of Patent: Oct. 29, 2013

(54) TOGGLE LINK DECK TO BUILDING CONNECTOR

(75) Inventor: Bernd Walther, Efringen-Kirchen (DE)

(73) Assignee: GRK Canada Ltd. (CA)

( * ) Notice: Subject to any disclaimer, the term of this patent is extended or adjusted under 35 U.S.C. 154(b) by 0 days.

(21) Appl. No.: 13/270,367

(22) Filed: Oct. 11, 2011

(65) Prior Publication Data

US 2012/0260600 A1    Oct. 18, 2012

(30) Foreign Application Priority Data

Apr. 4, 2011    (CA) .................................... 2736291

(51) Int. Cl.
E04B 1/38    (2006.01)
E04C 5/00    (2006.01)
E04C 5/08    (2006.01)
E04C 3/10    (2006.01)

(52) U.S. Cl.
USPC ............. 52/712; 52/92.1; 52/93.1; 52/223.8; 52/223.13

(58) Field of Classification Search
USPC ............... 52/248, 285.1, 285.2, 285.3, 285.4, 52/295, 92.1, 92.2, 93.1, 223.8, 223.13
See application file for complete search history.

(56) References Cited

U.S. PATENT DOCUMENTS

| 2,093,872 | A | * | 9/1937 | McCoy | 174/208 |
|---|---|---|---|---|---|
| 2,647,943 | A | * | 8/1953 | Kreisler | 174/207 |
| 2,932,072 | A | * | 4/1960 | Pruchnow | 24/129 A |
| 3,175,453 | A | * | 3/1965 | Williams | 411/352 |
| 3,376,034 | A | * | 4/1968 | Ondrejka | 267/71 |
| 4,286,497 | A | * | 9/1981 | Shamah | 411/342 |
| 4,294,156 | A | * | 10/1981 | McSherry et al. | 411/345 |
| 4,650,386 | A | * | 3/1987 | McSherry et al. | 411/340 |
| 4,666,229 | A | * | 5/1987 | Grand | 439/451 |
| 4,744,192 | A |   | 5/1988 | Commins |  |
| 4,810,146 | A | * | 3/1989 | Sinclair | 411/342 |
| 4,912,816 | A | * | 4/1990 | Brandt | 24/129 R |

(Continued)

FOREIGN PATENT DOCUMENTS

| CA | 2148590 | 5/1994 |
|---|---|---|
| CA | 2337157 | 12/1999 |
| CA | 2362168 | 8/2000 |
| CA | 2585161 | 6/2006 |

OTHER PUBLICATIONS

Office Action dated Nov. 28, 2012 in U.S. Appl. No. 13/231,038.*

(Continued)

*Primary Examiner* — Andrew Triggs
(74) *Attorney, Agent, or Firm* — Snell & Wilmer L.L.P.

(57) ABSTRACT

A device for connecting an exterior deck structure to a contiguous building via a bore-hole through the deck ledger and building header retains the deck in place in the event of earthquake or similar stresses. A pair of tension members comprising interlocked tensile links, are encapsulated in a generally cylindrical plastic plug to maintain ½ to 2 inches separation, to provide a thermal barrier. A pivoting toggle pin on the end of one link pivots between a first position aligned with the axis of the link and a second position transverse to the axis. The plastic plug may have an extending lip supporting the pivot pin in axially alignment. The second link may be rigid or flexible, has a sealing member adapted to slide thereon to seal the bore-hole. The second link is adapted to be fastened securely to a joist or other appropriate member of the deck.

12 Claims, 12 Drawing Sheets

(56) References Cited

U.S. PATENT DOCUMENTS

| | | | |
|---|---|---|---|
| 5,702,218 A * | 12/1997 | Onofrio | 411/552 |
| 5,898,987 A * | 5/1999 | Onofrio | 29/446 |
| 5,950,284 A * | 9/1999 | Persson | 24/129 R |
| 6,161,999 A * | 12/2000 | Kaye et al. | 411/344 |
| 6,490,840 B1 * | 12/2002 | Thompson | 52/715 |
| 6,862,854 B1 | 3/2005 | Fitzmyers | |
| 7,086,803 B2 * | 8/2006 | Ackerman et al. | 403/210 |
| 7,198,253 B2 * | 4/2007 | Striebel et al. | 254/231 |
| 7,562,494 B2 * | 7/2009 | Platts | 52/23 |
| 7,849,658 B2 * | 12/2010 | Platts | 52/745.12 |
| 2005/0016114 A1 * | 1/2005 | Thompson | 52/698 |
| 2009/0249738 A1 * | 10/2009 | Brereton et al. | 52/741.2 |
| 2012/0233957 A1 * | 9/2012 | Walther | 52/707 |
| 2012/0260600 A1 * | 10/2012 | Walther | 52/712 |

OTHER PUBLICATIONS

Final Office Action dated Mar. 21, 2013 in U.S. Appl. No. 13/231,038.*
Advisory Action dated May 16, 2013 in U.S. Appl. No. 13/231,038.*
Office Action dated Jun. 24, 2013 in U.S. Appl. No. 13/231,038.*
Notice of Allowance dated Aug. 21, 2013 in U.S. Appl. No. 13/231,038.*

* cited by examiner

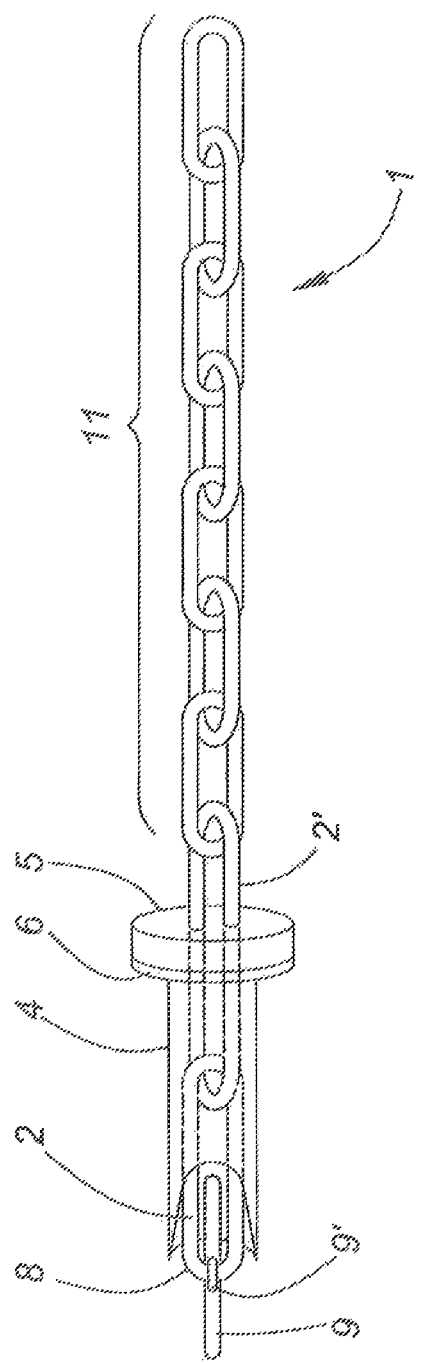

TOGGLE LINK DECK TO BUILDING CONNECTOR

FIELD OF DISCLOSURE

The present invention relates to a connector for securely tying an exterior deck structure to the interior structural framing of a building. Connectors of this type are desirable to maintain structural integrity in the connection between the building and the attached exterior deck under extreme conditions, including high winds, hurricanes and particularly earthquakes.

BACKGROUND OF THE INVENTION

Typically, wooden decks extend from a building or house structure, at an elevation above ground. Typically they have a ledger board adjacent the building structure from which joists and remaining deck structure elements extend. In the past, ledger boards have simply been nailed or lagged to the building structure, typically through the exterior cladding, sheathing and into a framing joist or header of the building. Under excessive tensile load, the lag screws or nails can readily fail, whereupon the deck ledger board becomes detached, allowing the deck to fall free. Consequently, a means for retaining the ledger board, together with the deck structure, securely in place is desirable, particularly under turbulent conditions.

BACKGROUND ART

While through bolts have been employed in the past to interconnect the ledger board of the deck with the header of the building structure, and have greater tensile resistance in view of washer and nut connections on either end, these typically are attached solely to the header and placed undue stress on the header during an earthquake and other turbulence.

Other means, such as Simpson™ Strong-Tie™ devices, including model DTT2Z, provide a pair of flanged metal components, one of which is attached to an exterior deck joist adjacent the ledger board and another is placed on an interior joist of the building, adjacent the header, with a threaded metal rod extending between the two metal brackets. This provides increased security by tying a deck joist directly to a building joist. The device, however, is only practical where the deck joist and the building joist are in alignment, and cannot be installed where there is a significant lateral off-set between the two joists. Furthermore, the device requires a metal rod to pass from the exterior of the building to the interior, thus conducting any temperature gradient into the building, often resulting in condensation, frost, rust and corrosion, not to say mold and wood rot, in the building, which can ultimately result in failure of the connector and surrounding structure.

Still another device, developed by the present applicant, is a deck brace having two interlocked flexible metal loops, encased in a plastic cylinder at the point of interlock, and adapted to extend through a bore-hole in an exterior joist or header of a building structure and the corresponding ledger of a deck, with an interior end of the metal loop attached to an interior joist and the exterior end of a metal loop attached to an exterior deck joist, providing a continuous strong connection between the interior building structure and the exterior deck structure. The plastic provides a thermal break by separating the encased metal loops. Installation, however, requires access to the interior of the building structure to connect the interior loop thereto.

SUMMARY

The present invention overcomes problems of existing connectors by providing a "structure-to-deck" connector which may be installed from the exterior of the structure, and avoiding the necessity of interior access of other connectors. The present connector retains the tensile strength of metal connections, the sealing advantages of a defined plastic plug and cover, together with the benefits of an insulated, non-thermal conducting device. The invention is illustrated and understood from the attached drawings which describe one or more embodiments of the connector device wherein:

FIG. 10 illustrates an alternate embodiment of the device.

DETAILED DESCRIPTION OF THE INVENTION

The present invention is a connector designed to provide a high strength continuous connection from the interior surface of the header of a building structure through the ledger board of a deck structure, and to a joist of the deck.

Figure 1:
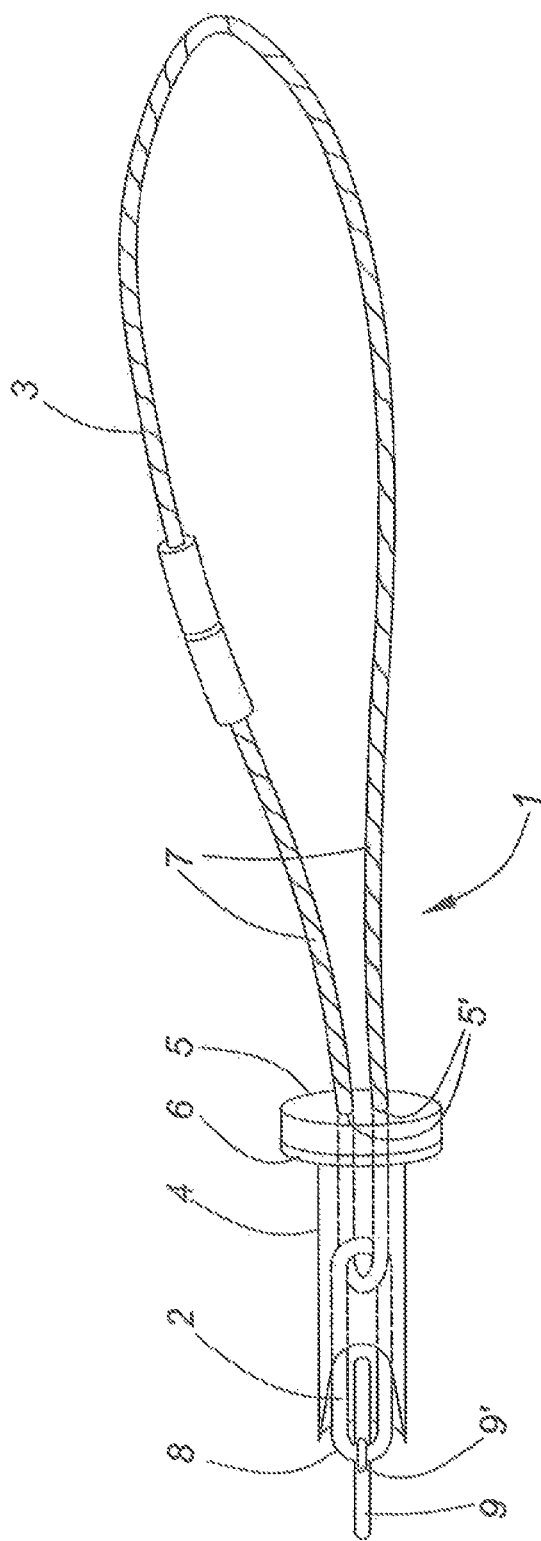
FIG. 1 illustrates an overall view of the device.

Referring to FIG. 1, in one embodiment the connector 1 of the present invention comprises a closed elongated metal link 2 of high tensile strength, interlocked with a wire rope loop 3 of equivalent tensile strength. By interlocked, it is meant that the link and the loop are intertwined, one passing through the other, but not necessarily in contact with each other. At the point of interlocking, a plastic plug or sleeve 4 encapsulates the link and loop, whereby the link and loop are not in physical contact, but are maintained separated by the plastic encapsulation to provide a thermal break between the metal link and loop components.

The wire rope loop 3 extends for an appropriate length beyond the point of plastic encapsulation to permit attachment to a deck joist. A sealing cap or cover 5, having parallel apertures 5 is provided to slide on the generally parallel cables 7 of the wire rope loop 3, toward the encapsulating plastic plug 4. The covers and seal 6 serve as a sealing cover against the ledger board L of a deck.

One end of the longitudinal metal link 2 also extends beyond the plastic encapsulation sleeve 4 to provide a U-shaped extending portion 8. Fundamental to the operation of the device is an unevenly balanced toggle pin 9 adapted to pivot about the base of the U-shaped extending portion 8 of the metal link 2. The toggle pin may have arms of unequal length and may be pivoted by any appropriate means such as the bracket 9' illustrated.

Figure 2A:
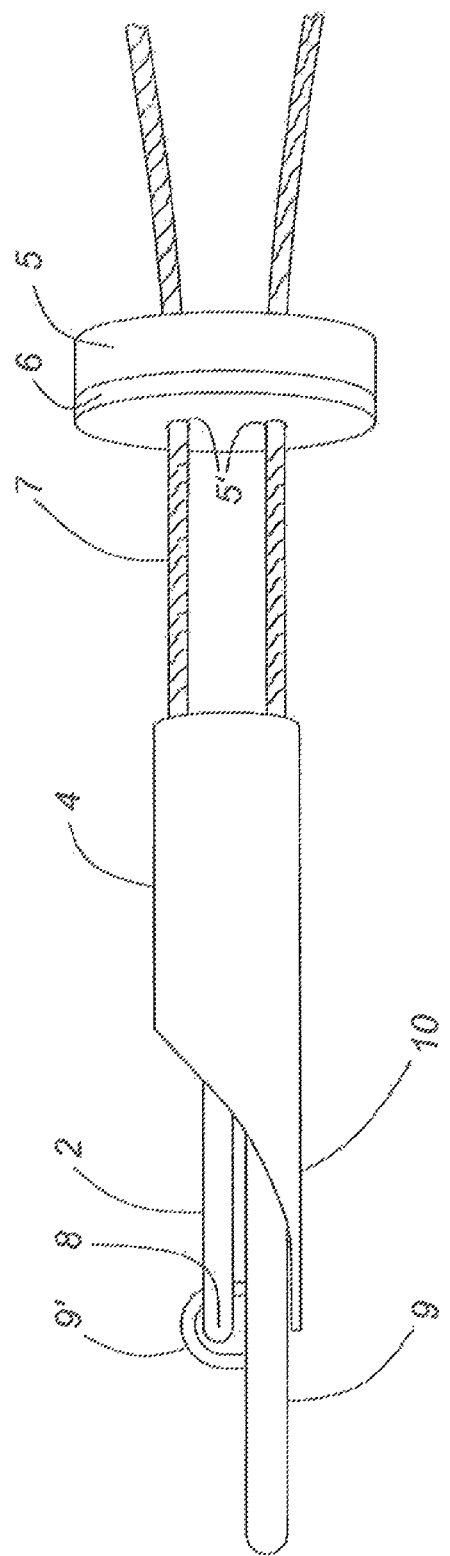
FIG. 2A illustrates a side view close-up of the toggle end of the device wherein the toggle is illustrated in non-deployed (aligned) position.
Figure 2B:
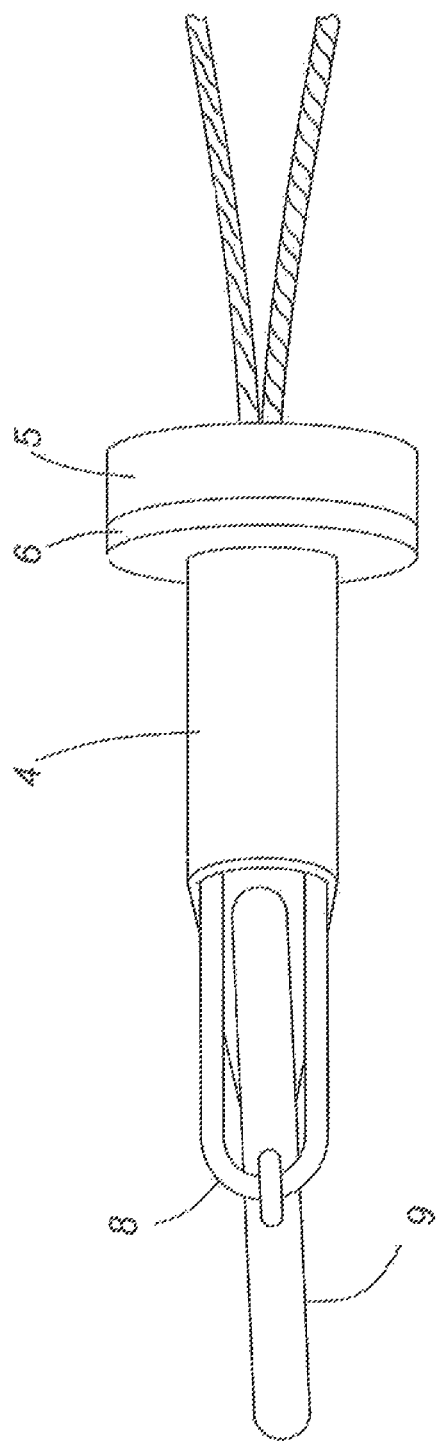
FIG. 2B illustrates a plan view of the device of FIG. 2A.
Figure 2C:
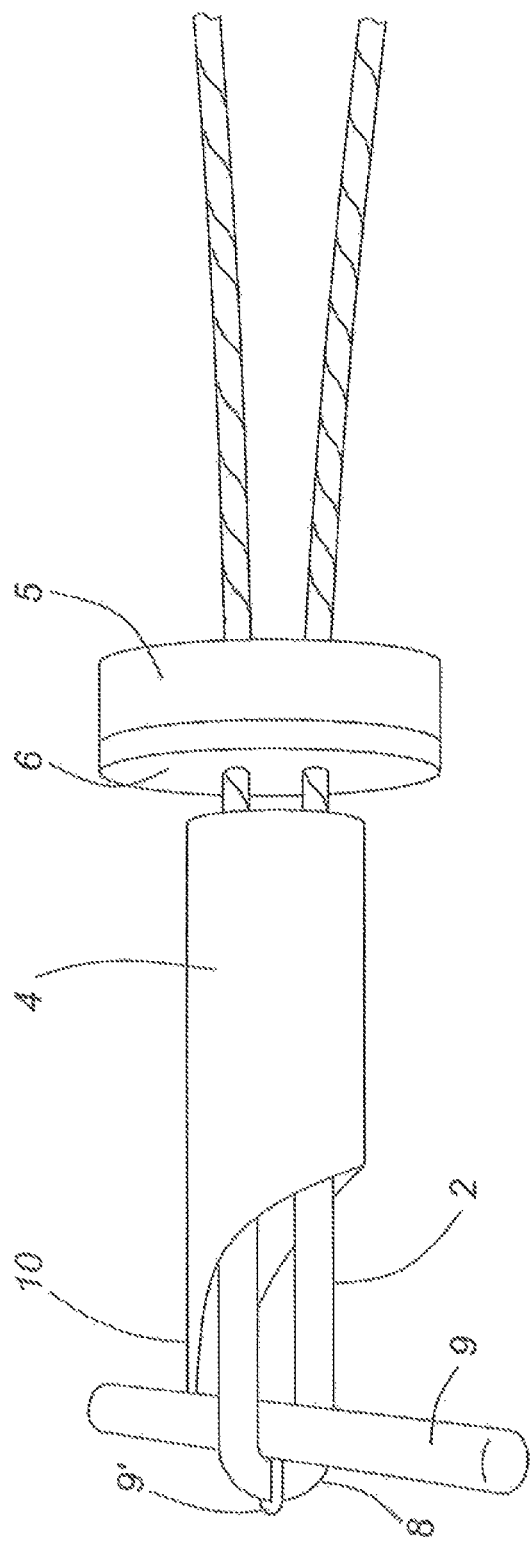
FIG. 2C illustrates an inclined side view of the device with the toggle illustrated in a deployed (transverse) position.
Figure 3:
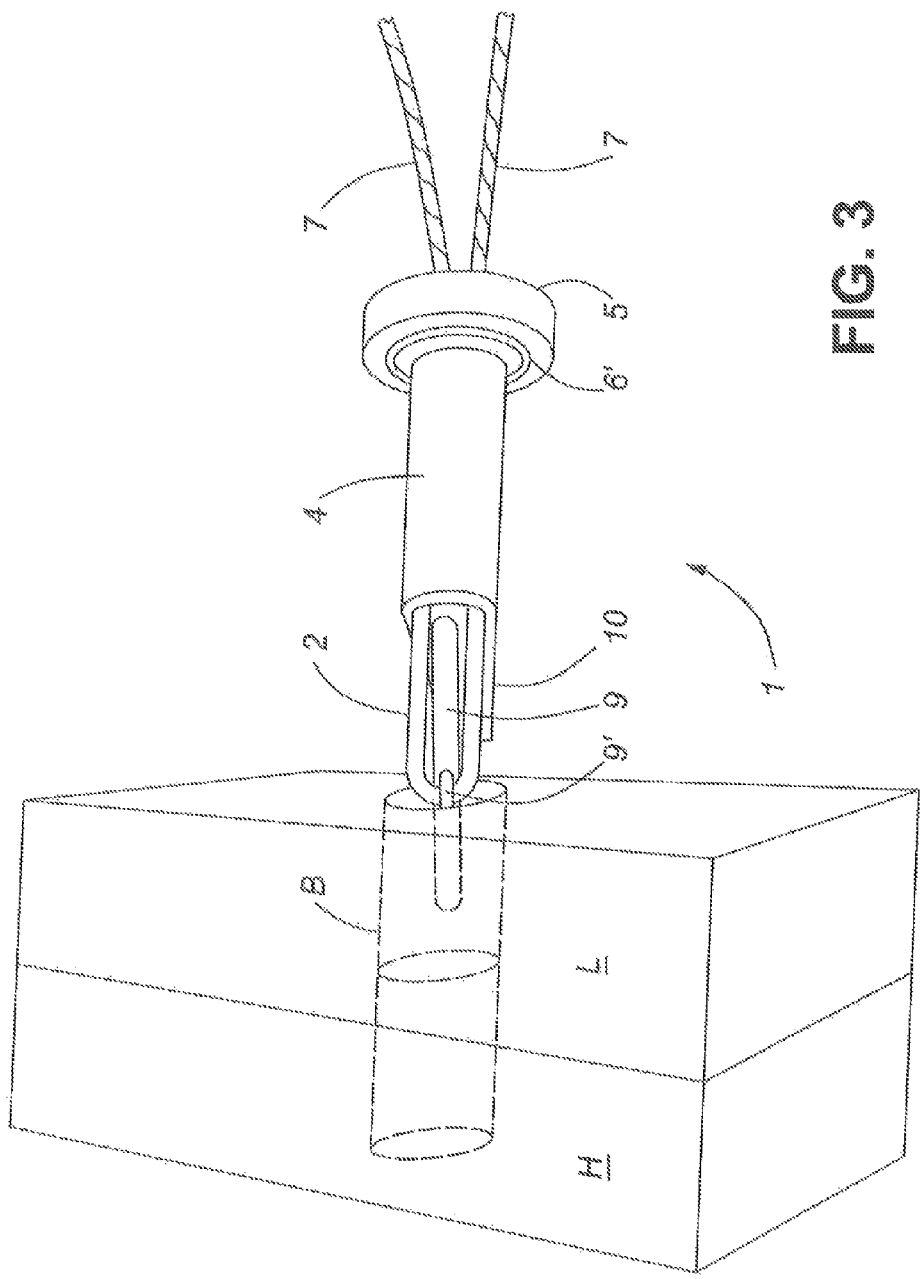
FIG. 3 illustrates the device being inserted into a bore-hole through a ledger and header.

Prior to installation, the unbalanced toggle pin is aligned parallel to the axis of the connector with one heavier arm extending toward the plastic encapsulation plug, and resting on a lip 10 extending on a lower surface of the encapsulating sleeve or plug 4 (see FIGS. 2A and 2B). The toggle pin 9 is unevenly balanced about a pivot point on the link end 8, such that gravity tends to pull the heavier end downwardly, whereby the toggle pin can be reoriented transverse to the longitudinal axis of the connector device (see FIG. 2C). The uneven balance may be achieved by providing the toggle pin with unequal arm lengths, or by providing a greater cross-section to one arm, thereby creating greater weight.

Figure 4:
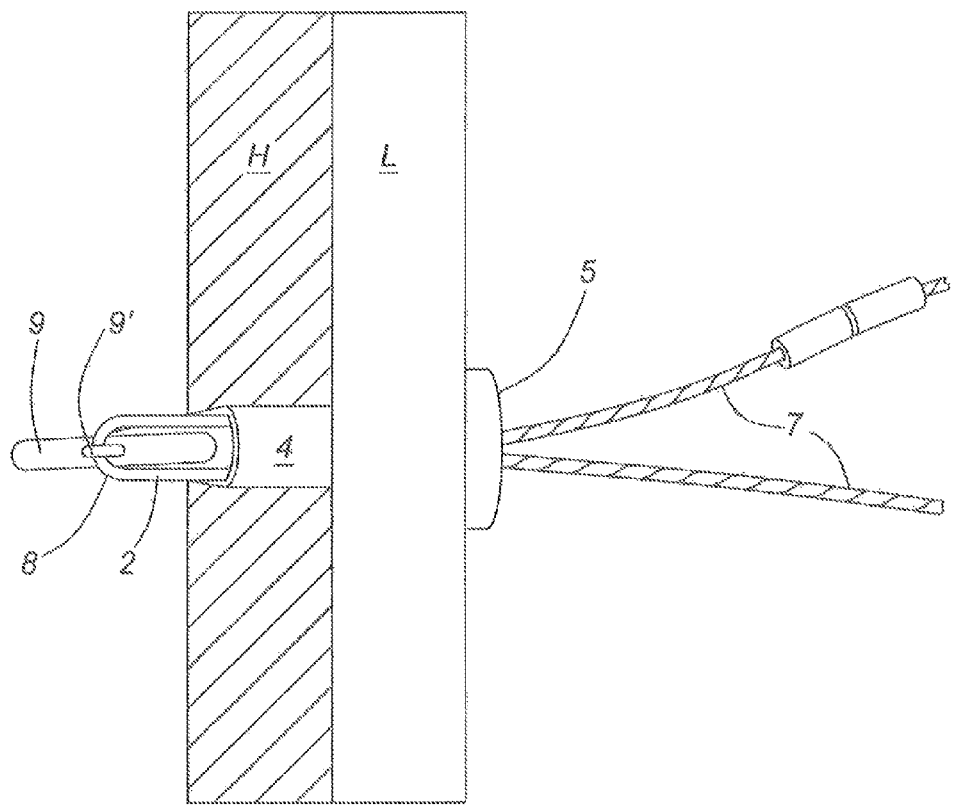
FIG. 4 is a plan view partially in section illustrating the device fully inserted through the bore-hole without the toggle pin being deployed.
Figure 5:
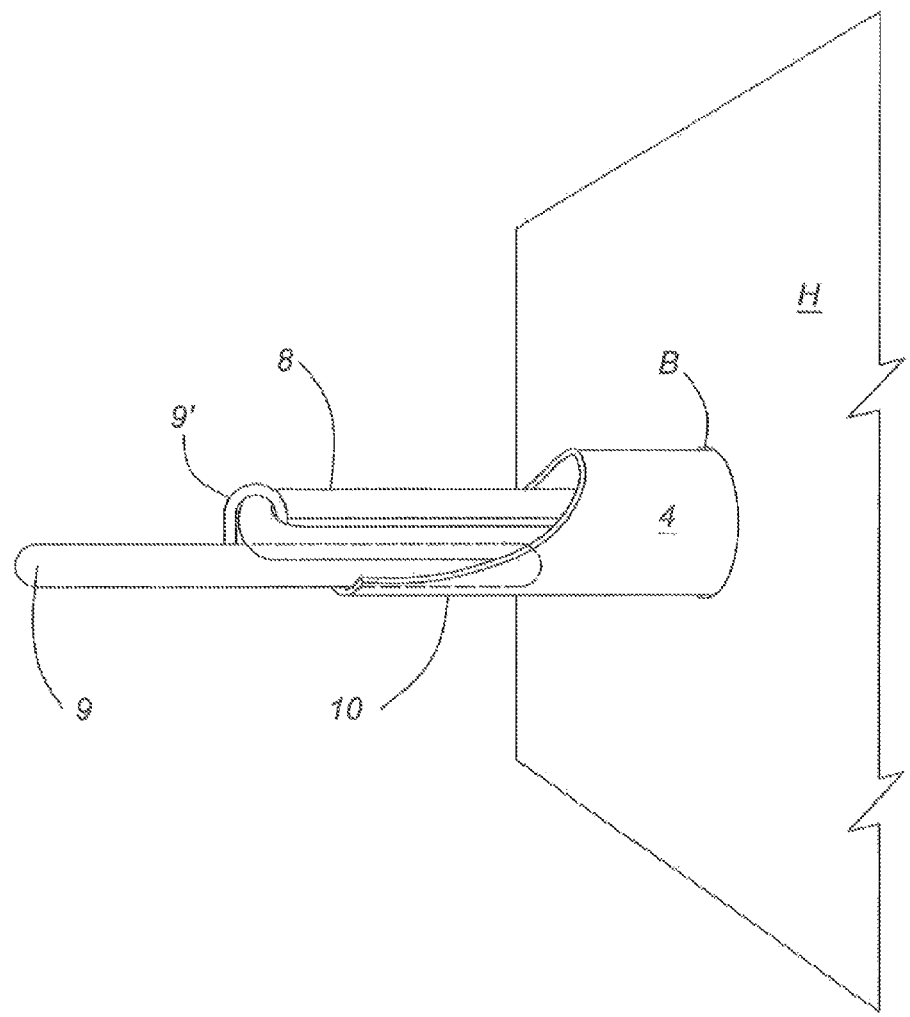
FIG. 5 is a side view of the device extending through the bore hole with the toggle pin before deployment.
Figure 6:
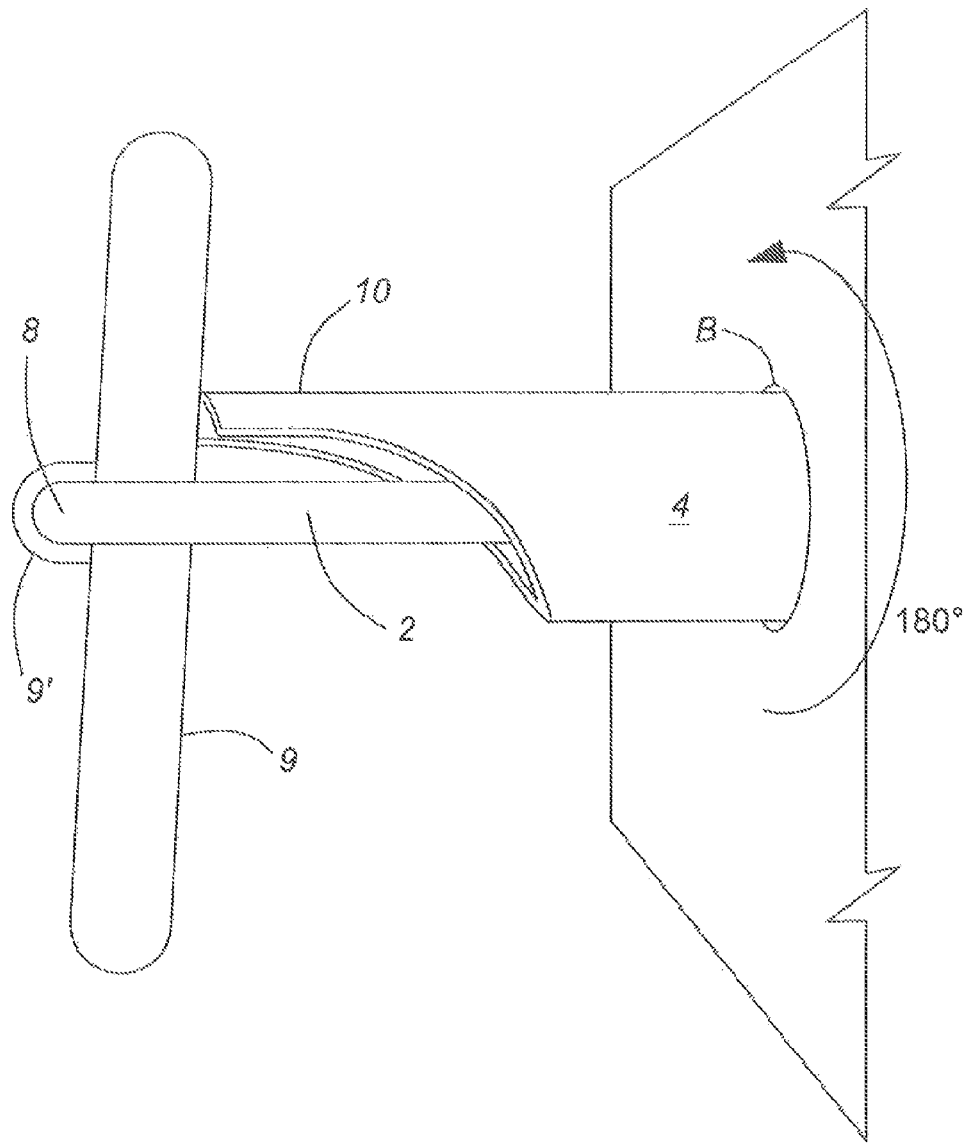
FIG. 6 is a side view of the device after rotation with the toggle deployed.
Figure 7:
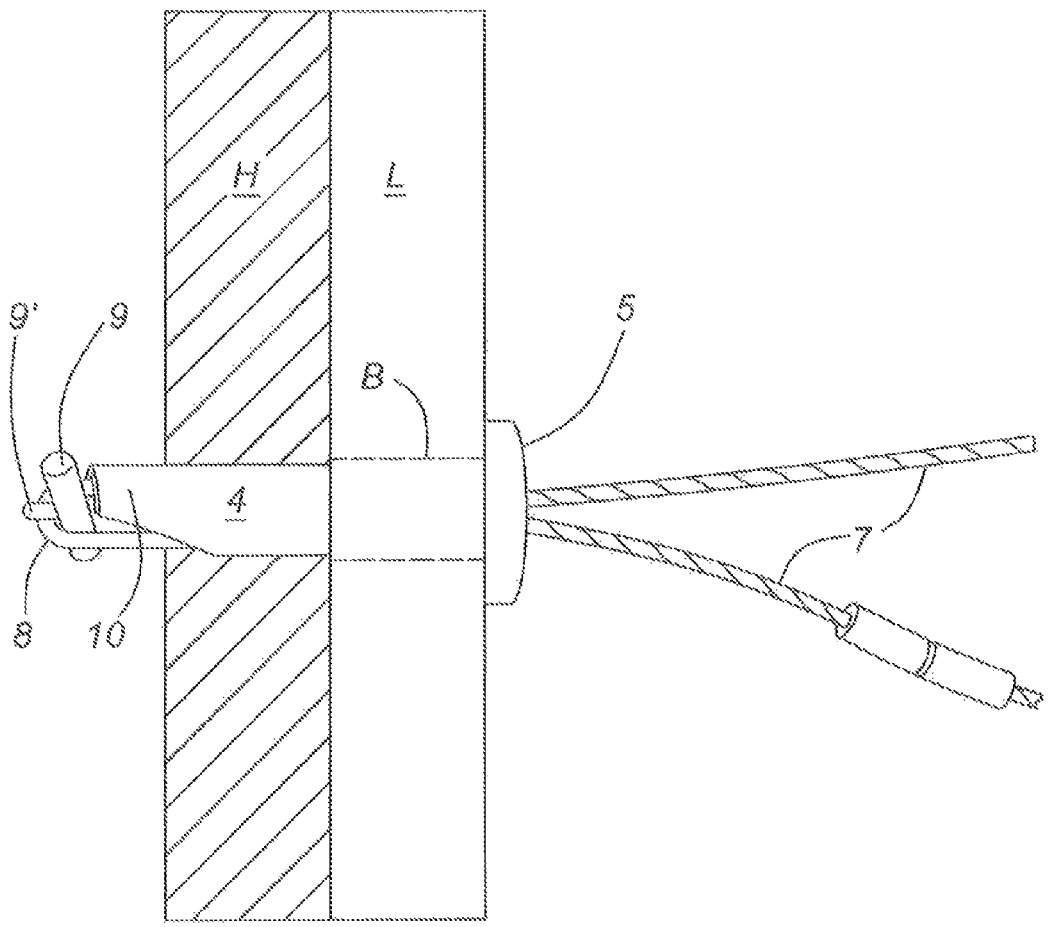
FIG. 7 is a plan view of the device with the toggle deployed in a header/ledger shown partially in section.
Figure 8:
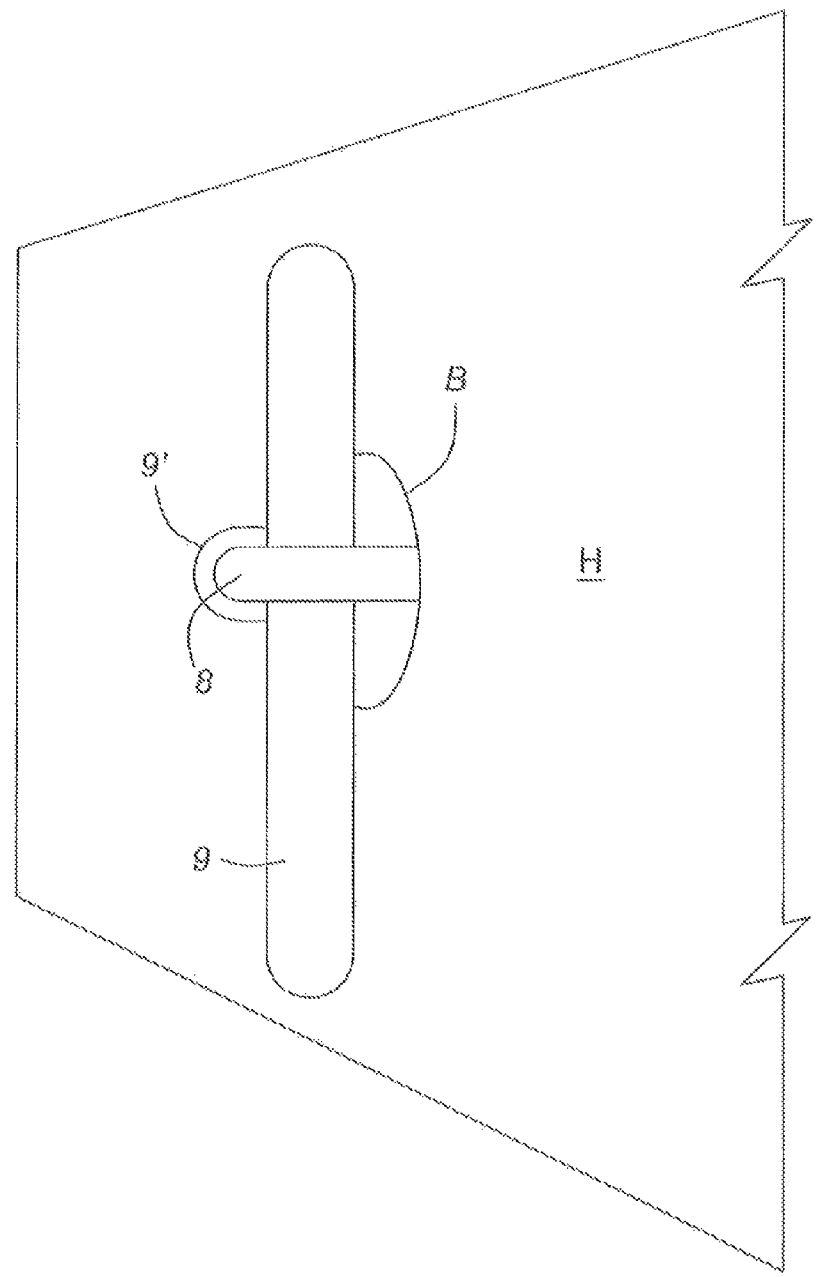
FIG. 8 shows the toggle tightened against the interior header.
Figure 9:
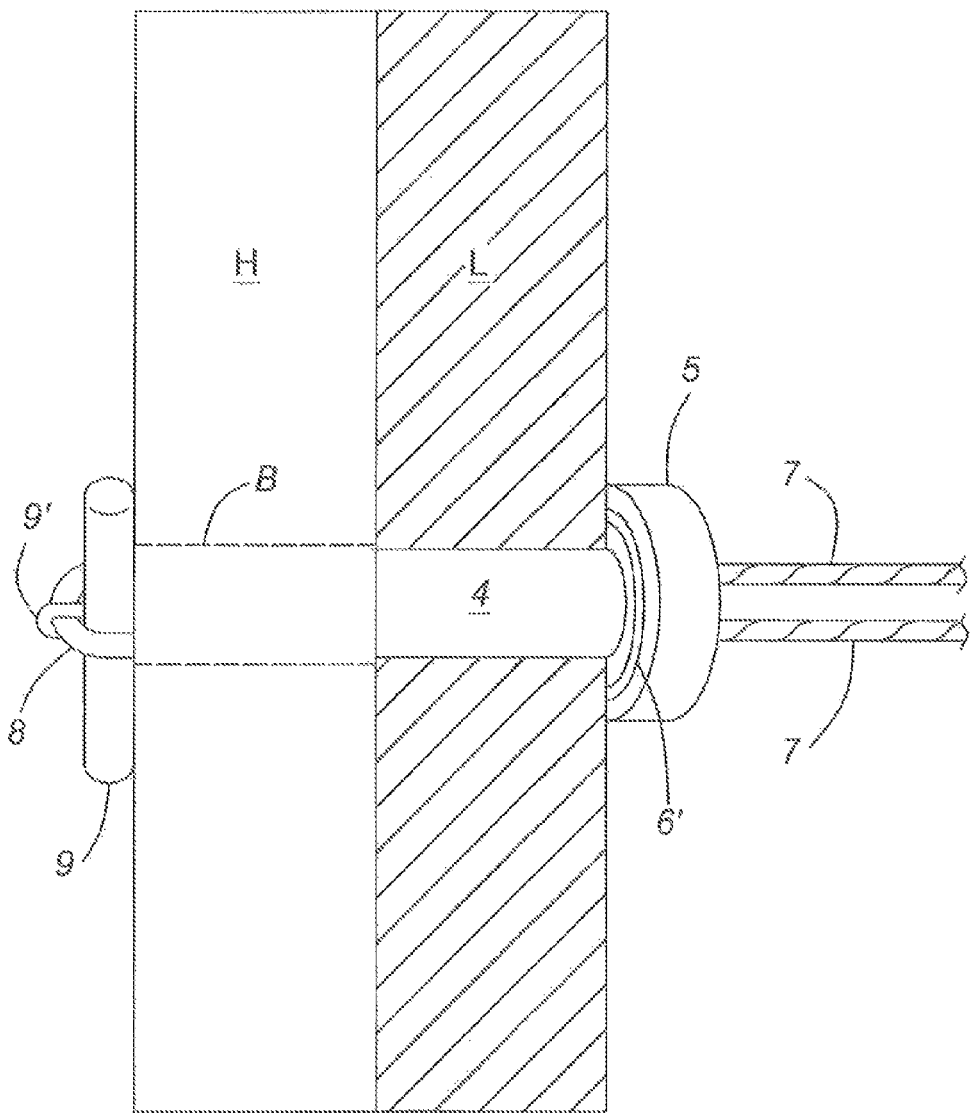
FIG. 9 illustrates the installed device with the sealing cap closed against the ledger board.

The connector is passed through a clearance hole B in the deck ledger and the structure header (FIG. 4). Once the pin is clear of the hole, (FIG. 5), the device is rotated 180° (FIG. 6) whereby the pivotable toggle pin 9 is no longer supported by the lip 10, and the unbalanced heavier arm drops by gravity into a position transverse to the link 2 (FIG. 7). After rotation, whereby the toggle pin moves transversely to the axis, the connector is drawn outwardly until the toggle pin 9 bridges the clearance hole (see FIGS. 8 & 9).

Referring now to FIGS. 3-8, in order to "blind" install the toggle deck connector from the exterior side, an aperture or clearance bore hole B is drilled or otherwise formed through the ledger board L of the deck and through the building structure including cladding, sheathing and structural header H. The connector device is oriented in a first position whereby the pivoting toggle pin is aligned with the axis of the device, resting on the extended lip 10 of the plug or sleeve 4 (see FIGS. 2A and 3).

The connector is passed through the clearance hole B in the deck ledger and the structure header (FIG. 4). Once the device is fully inserted and the pin is clear of the hole, (FIG. 5), the device is rotated 180° (FIG. 6) whereby the pivotable toggle pin 9 is no longer supported by the lip 10, and the unbalanced heavier arm drops by gravity into a position transverse to the link 2 (FIG. 7). After rotation, whereby the toggle pin moves to a position transverse to the axis, the connector is drawn outwardly until the toggle pin 9 bridges the clearance hole (see FIGS. 8 & 9) to thereby retain the toggle pin against the interior header.

Tension is then applied to the exterior loop 7 and the distal or extending end of the loop is then securely fastened by appropriate conventional means to a joist or other appropriate member of the deck, thereby providing a continuous high tensile connection from the toggle in the interior of the building structure to the exterior deck joist connection point. The exact method of fastening the metal loop may entail bolts, clamps or other suitable means. This installation is achieved solely from the exterior side without the necessity of access to the interior of the building.

Typically two or three such connector devices are employed, depending on the length of the deck attachment to the building. In the event of catastrophic earthquake or hurricane, forces tending to separate the deck and ledger board from the building structure apply tensile load on the connecting device. However, the device, being retained on the interior header via the transverse toggle pin and to an exterior joist via the metal loop, ties the deck structure to the building structure and prevents its removal. In the further event that forces exceeding the rupture strength of the plastic plug are applied to the connector, the thermal separating plastic portions of the plug may be crushed, allowing the two lengths to come into contact. However, the interlocked loops provide a solid physical connection to prevent any significant movement of the deck relative to the building structure.

In a further embodiment of the invention, a pair of interlocked elongated rigid metal links are employed rather than a single link and wire rope loop. As disclosed with the previous embodiment, the two links are interlocked but held out of physical contact by an encasing plastic plug. A length of chain attached to the exterior link may be used in place of the wire rope loop.

The exterior metal link has a sliding cap 5 adapted to move along the parallel arms of the exterior metal link, and, when provided with a sealing material 6, (caulk, foamed rubber gasket, etc. or "o" ring 6' (see FIGS. 3 and 9) may be slid into contact with the exterior header face, sealing the bore-hole from the elements. The exterior metal link may be fastened directly to an appropriately positioned deck joist or may have a number of flexible chain links or a further wire rope loop adapted to be attached to an adjacent deck joist. The device provides a continuous high tensile connection from the interior of the building structure via the transverse toggle through to a solid mechanical connection to an exterior deck joist via the exterior link and/or further chain or cable links.

As will be appreciated, the unbalanced toggle pin is moved from an axially aligned position to a transverse position during installation of the device. Similarly, the toggle pin may be moved from the transverse position to an aligned position, thereby permitting removal of the device, by rotating the device back 180°. Such rotation raises the heavier arm of the unbalanced toggle pin above the axis of the device, thereby allowing it to drop under the influence of gravity against the extending lip into an axial alignment with the device. Then the device simply may be withdrawn from the bore-hole.

In one embodiment of the invention, the elongated metal links 2 are about 4 inches long and ¼ inch diameter, high tensile steel, capable of sustaining 4500 pound loading. The toggle pin 9 is ⅜ inch steel, having a length of approximately 3½ inches, with arms of 1½ inches and 2 inches respectively.

The encapsulating plastic plug and sleeve may be cylindrical, 1-1¼ inches in diameter, about 3 inches long (depending upon the thickness of the ledger, cladding and header) and provides ½-2 inches of plastic between the interlocked links providing a thermal break to prevent conduction along the cable from the exterior to the interior of the structure.

In an embodiment utilizing a wire rope loop, 3/16 inch aircraft cable is employed capable of sustaining 4500 pound loading.

While the invention has been described in relation to specific embodiments, variations of the dimensions and materials may be employed without departing from the scope of the invention as defined in the appended claims.

What is claimed is:

1. A high-strength connector device extending between an exterior deck structure of a building and an interior structural element of the building, for securely tying of the deck to the building, the device comprising:
    a closed elongated metal link and an elongated metal loop, the link and the loop being interlocked,
    an elongated plastic sleeve encasing the interlocked portions of the link and loop to maintain a separation therebetween, and
    a toggle pin pivotable on the distal end of the link between a first position parallel to the longitudinal axis of the link and a second position transverse to the longitudinal axis of the link, wherein when installed the toggle pin is retained against the interior structural element and the loop is securely fastened to the exterior deck structure, and wherein the connector device is installed from an exterior of the building avoiding the necessity of interior access.

2. The connector device of claim 1, wherein the metal loop is a high tensile wire rope loop.

3. The connector device of claim 1, wherein the metal loop is a second elongated closed metal link.

4. The device of claim 3, including a flexible linked chain extending from the second elongated closed metal link, and adapted to be fastened to the deck structure.

5. The connector device of claim 3, wherein the separation between the links is a thermal barrier.

6. The device of claim 1, wherein the toggle pin has arms of unequal weight.

7. The device of claim 6, wherein the toggle pin is pivotable under the influence of gravity.

8. The device of claim 7, wherein the plastic sleeve includes a lip supporting the toggle pin in alignment with the metal link.

9. The device of claim 8, wherein the plastic sleeve is cylindrical.

10. The device of claim 1, including a sealing member adapted to slide on the metal loop into sealing engagement with the deck structure.

11. The device of claim 3, wherein the links have a tensile strength of at least 4500 pounds.

12. The device of claim 1, wherein the metal link and metal loop are separated by ½ to 2 inches of plastic thermal barrier.

\* \* \* \* \*